United States Patent [19]

Leiser et al.

[11] Patent Number: 5,079,082

[45] Date of Patent: Jan. 7, 1992

[54] TOUGHENED UNI-PIECE FIBROUS INSULATION

[75] Inventors: Daniel B. Leiser; Marnell Smith, both of San Jose; Rex A. Churchward, Mountain View; Victor W. Katvala, San Jose, all of Calif.

[73] Assignee: The United States of America as represented by the Administrator of the National Aeronautics and Space Administration, Washington, D.C.

[21] Appl. No.: 298,149

[22] Filed: Jan. 18, 1989

[51] Int. Cl.$^5$ .............................................. B32B 5/14
[52] U.S. Cl. .................................. 428/307.7; 428/325; 428/446; 428/920; 501/39; 501/54
[58] Field of Search ............... 501/35, 39, 54; 264/43; 428/307.7, 446, 699, 325, 406, 920

[56] References Cited

U.S. PATENT DOCUMENTS 4,093,771  6/1978  Fletcher .............................. 428/325

Primary Examiner—James J. Bell
Attorney, Agent, or Firm—Darrell G. Brekke; Harold W. Adams; John R. Manning

[57] ABSTRACT

A porous body of fibrous, low density silica-based insulation material is at least in part impregnated with a reactive boron oxide containing borosilicate glass frit, a silicon tetraboride fluxing agent and a molybdenum silicide emittance agent. The glass frit, fluxing agent and emittance agent are separately milled to reduce their particle size, then mixed together to produce a slurry in ethanol. The slurry is then applied to the insulation material and sintered to produce the porous body.

10 Claims, 4 Drawing Sheets

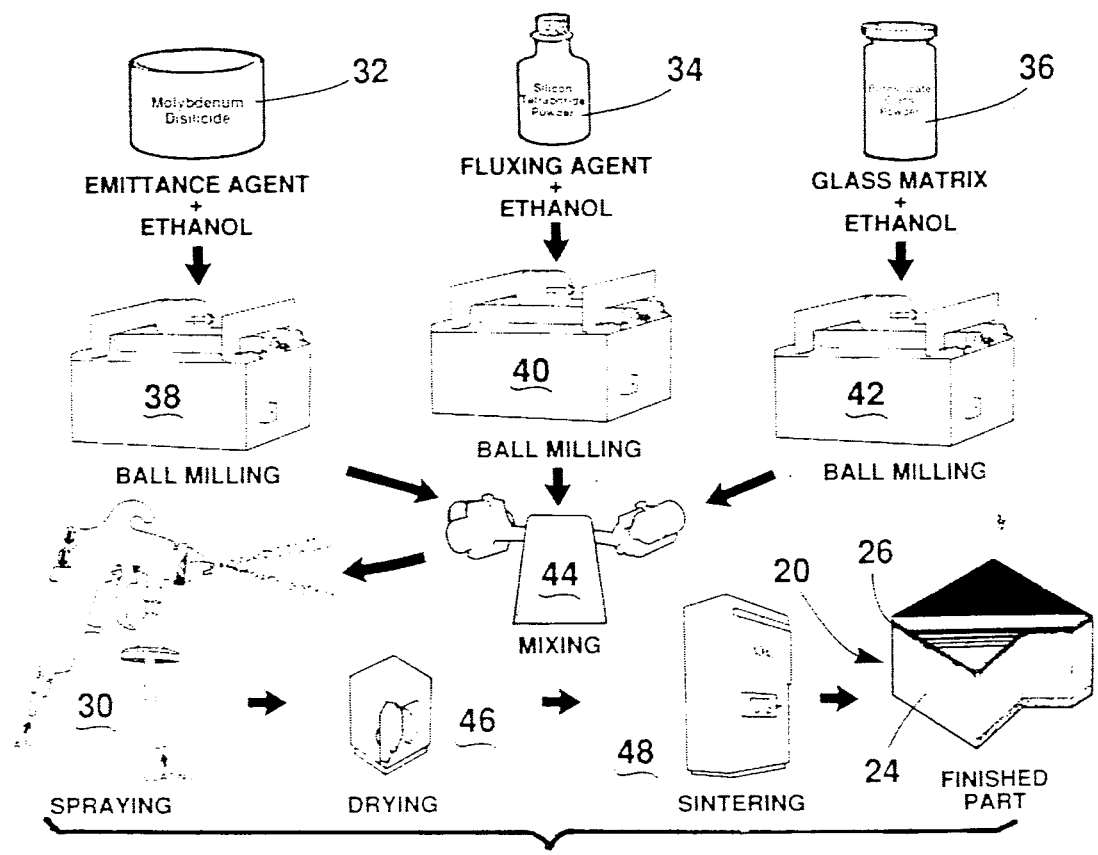
FIG. 4
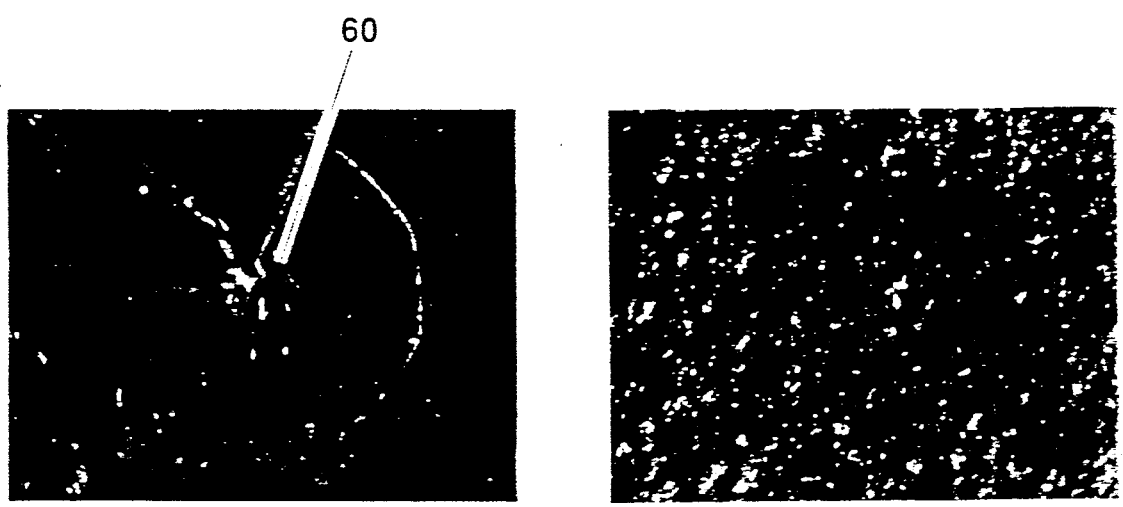
0.005 JOULE IMPACT
PRIOR ART
FIG. 5
1000 μ
0.01 JOULE IMPACT
FIG. 6

0.03 JOULE IMPACT 0.8 JOULE IMPACT

1000 μ

TOUGHENED UNI-PIECE FIBROUS INSULATION

ORIGIN OF THE INVENTION

The invention described herein was made by employees of the United States Government and may be manufactured and used by or for the Government for governmental purposes without the payment of any royalties thereon or therefor.

TECHNICAL FIELD

The present invention relates generally to composites incorporating low-density insulation materials. More particularly, it relates to such composites incorporating a porous coating to provide increased impact resistance and ease of waterproofing.

BACKGROUND ART

Previous composite insulating materials intended for use in such applications as on orbital reentry vehicles, such as the Space Shuttle, have consisted of a coating in combination with a low density insulation substrate. Examples of such composites are disclosed in the following references: Beasley, R. M., Izu et al., "Fabrication and Improvement of LMSC's All-Silica RSI", Tech. Report No. NASA TMX-2719, November 1972; Musikant, S., Magin III, F. P., and Gebhart, J. J., "Development of REI Mullite (Reusable External Insulation) for Application to the Space Shuttle", National SAMPE Technical Conference on Space Shuttle Materials, Vol. 3 SAMPE, pp. 413–445 (1971); Tanzilli, E. A., Musikant, S. M., Bolinger, P. N., and Brazel, J. P., "Optimization of REI-Mullite Physical Properties", NASA TMX-2719, pp. 227–260 (1972); Gebhart, J. J. and Gorsuch, P. D., "Processing of Rigidized REI-Mullite Insulative Composites", Tech. Rept. No. NASA TMX-2719, pp. 17–61 (1973); Rusert, E. L., Christensen, H., "HCF-External Thermal Insulation for Space Shuttle Thermal Protection System", National SAMPE Technical Conference on Space Shuttle Materials, Vol. 3. SAMPE, pp. 403–413 (1971); Plank, P. P., Feldman, A. et al., "MAR-SI, Martin Surface Insulation", NASA TM X-2719, Vol. 1, 1972. A borosilicate glass, Reaction Cured Glass (RCG), was chosen as the coating for the silica type of Reusable Surface Insulation (RSI) selected as the heat shield for the Space Shuttle, as disclosed in Goldstein, H. E. et al., U.S. Pat. No. 4,093,771, issued June 6, 1978 and Goldstein et al., "Reaction Cured Borosilicate Glass Coating for Low Density Fibrous Silica Insulation" in Borate Glasses: Structure, Properties, Applications, Plenum Publishing Corp., 623–634 (1978). This coating was prepared by blending an emittance agent, silicon tetraboride, with a specially prepared borosilicate glass powder, composed of 94% by weight silica and 6% by weight boron oxide, and an ethanol carrier in a ball mill. The resulting slurry was sprayed on the silica substrate. The application characteristics of the mixed slurry were optimized to limit sagging during spraying and limit penetration of the slurry into the low density insulation. After drying, the coating was sintered (fused) to a "theoretical" density of 2.2 g/cc at 1220° C. (2225° F.). The "as fired" RCG coating weighs 0.07 g/sq.cm. (0.15 lbs/sq.ft.) and is approximately 0.3mm (0.013 in) thick and has been applied to advanced insulation systems. Further details on these composites and their use are provided in the following references: Leiser et al., U.S. Pat. No. 4,148,962, issued Apr. 10, 1979; Leiser, D. B., Smith M., and Goldstein, H. E., "Development in Fibrous Refractory Composite Insulation", American Ceramic Society Bulletin, 60, No. 11, pp. 1201–1204 (1981); Leiser, D. B., Smith M., and Stewart,D. A., "Options for Improving Rigidized Ceramic Heatshields", Ceramic Engineering and Science Proceedings, 6, No. 7-8, pp. 757–768 (1985) and Leiser, D. B., Smith M., and Stewart,D. A., "Effect of Fiber Size and Composition on Mechanical and Thermal Properties of Low Density Ceramic Composite Insulation Materials", NASA CP 2357, pp. 231–244 (1984). Other references relating to composite insulating materials include Fletcher et al., U.S. Pat. No. 3,953,646, issued Apr. 27, 1976; Fletcher et al., U.S. Pat. No. 3,955,034, issued May 4, 1976 and Johnson et al., U.S. Pat. No. 4,612,240, issued Sept. 16, 1986.

SUMMARY OF THE INVENTION

Accordingly, it is an object of this invention to provide a composite insulating material suitable for use in such applications as on orbital vehicles for thermal insulation during reentry which is more impact resistant than previous materials employed for such applications.

It is another object of the invention to provide such a composite insulating material that is easier to waterproof than previous materials employed for such applications.

It is a further object of the invention to provide such a composite insulating material that has a higher resistance to thermal shock than previous materials employed for such applications.

It is still another object of the invention to provide such a composite insulating material that has a lower modulus of elasticity surface layer (i.e., higher strain to failure) than previous materials employed for such applications.

The attainment of these and related objects may be achieved through use of the novel porous body of fibrous, low density silica-based insulation material and process for making the material herein disclosed. A porous body of fibrous, low density silica-based insulation material in accordance with this invention is at least in part impregnated with a reactive glass frit, a fluxing agent and an emittance agent. In the process, the glass frit, fluxing agent and emittance agent are separately milled to reduce their particle size, then mixed together to produce a slurry. The slurry is then applied to the insulation material and sintered to produce the toughened porous body.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 4 is a flow diagram of a process for preparing the composite insulating material of FIGS. 2-3.

FIGS. 5–8 are photomicrographs showing comparative test results with the composite insulating material of FIG. 1 and of FIGS. 2-3.

DETAILED DESCRIPTION OF THE INVENTION

Figure 1:
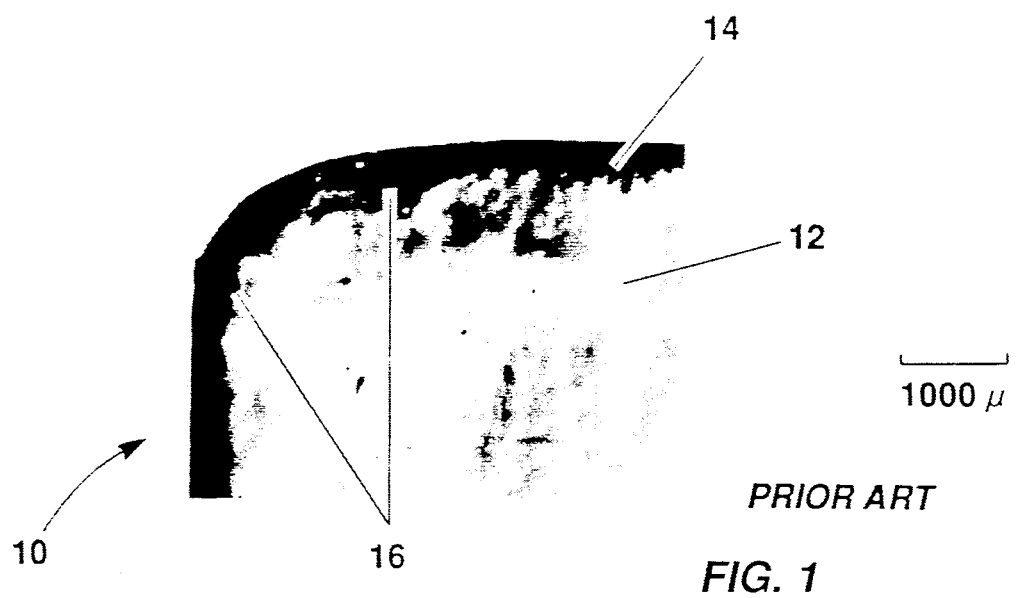
FIG. 1 is a photomicrograph of a portion of prior art composite insulating material.

Turning now to the drawings, more particularly to FIG. 1, there is shown a representative prior art composite insulating material 10. A layer 12 of silica insulation has a reaction cured glass (RCG) coating 14 over the silica insulation layer 12. There is a clearly defined interface 16 between the layer 12 and the coating 14. Further details on the process for making the prior art material 12 are provided above and in the prior art references listed above.

Figure 2:
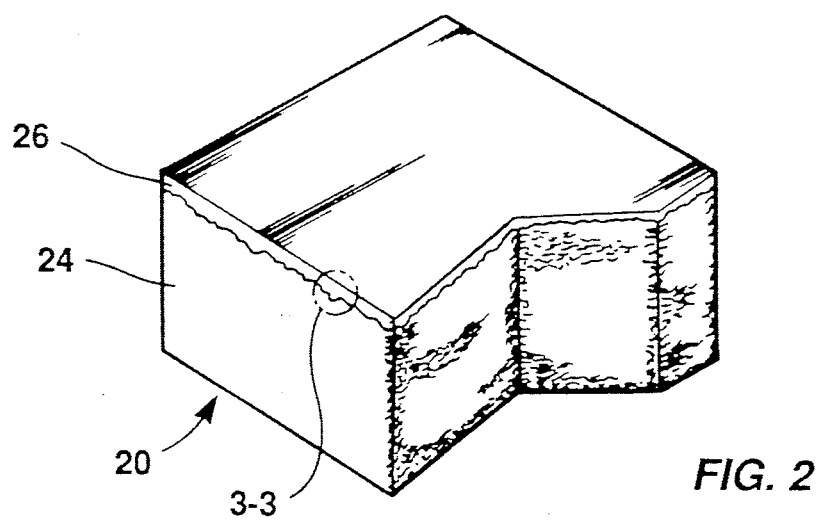
FIG. 2 is a perspective view of composite insulating material in accordance with the invention.
Figure 3:
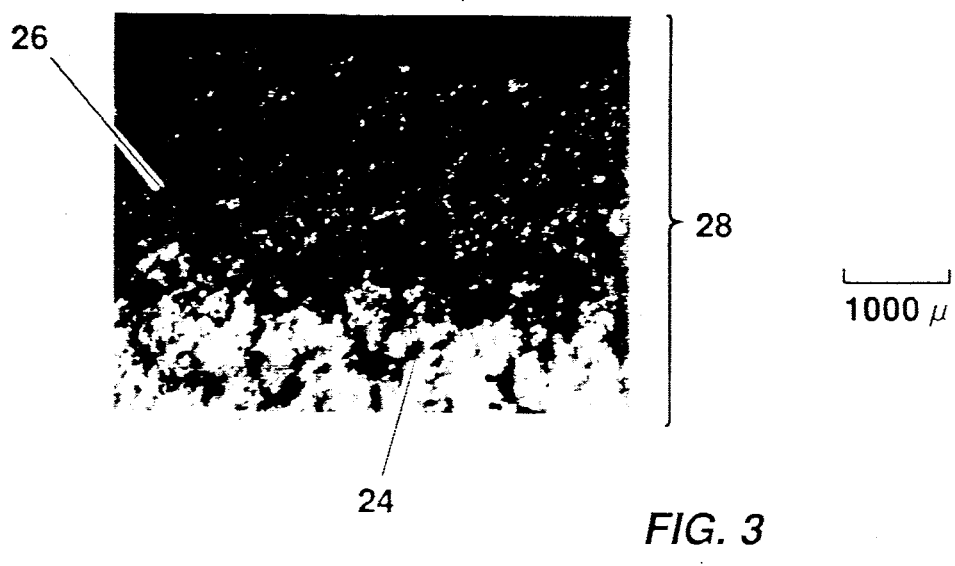
FIG. 3 is a photomicrograph of the area 3—3 in FIG. 2 and corresponding to the photomicrograph of FIG. 1.

FIGS. 2 and 3 show composite insulating material 20 of this invention. Insulating substrate 24 is a similar silica-based insulation to that of the layer 12 of FIG. 1. A porous surface coating 26 is provided on the substrate 24. The coating 26 is considerably thicker (0.5mm) than the coating 14 (0.3mm). The coating 26 gradually transforms in appearance from a dark gray/black surface to gray to the white insulation substrate 24 with depth. As is best shown in FIG. 3, no clear cut interface exists between the coating 26 and the substrate 24, making it appear to be a graded composite. The density of the coating 26 is considerably reduced (about 0.66g/cc) from that of the coating 14 (about 2.2g/cc). The quantity of the coating 26 applied to the substrate 24 is increased to 0.14 g/cm$^2$, compared to 0.07 g/cm$^2$ for the coating 14, about twice that used for the coating 14, allowing further enhancement of the system's toughness. The coating 14 is nonporous. The coating 26 has a porosity of about 70%. This more porous surface permits a substantial increase in coating thickness without as large an increase in coating weight. The large number of open pores effectively inhibits crack propagation from impact sites and permits easy rewaterproofing by simple absorption into the RSI substrate 24, which was impossible with the impervious RCG coating 14. The improved surface toughness of the coating 26 minimizes damage to the RSI substrate 24 as a result of impact.

The process for making the composite insulation material 20 is shown in FIG. 4. In this process, the coating 26 quantity deposited is increased, particle size used to make the coating 26 is reduced, and the components of the coating 26 are modified relative to the coating 14. The reduced particle size allows effective impregnation of outer portion 28 of the substrate 24 during spraying 30 with the coating material, creating a composite-fiber-reinforced surface. Each component, emittance agent 32, fluxing agent 34 and glass matrix 36 is ball-milled separately at 38, 40 and 42 in ethanol at 25% by weight solids for a specific time to reduce its particle size and allow penetration into the porous substrate 24. The molybdenum disilicide emittance agent 32 and the borosilicate glass matrix 36 are ball-milled for 20 hours. The silicon tetraboride fluxing agent 34 is ball-milled for 3 hours. After milling, an ethanol-based "master" slurry is prepared by combining the reactive borosilicate glass frit 36, the silicon tetraboride 34 and molybdenum disilicide 32 in proportions of 77.5%, 2.5% and 20% by weight, respectively, in a Kendall mixer 44 long enough to achieve a homogeneous dispersion. A second emittance agent, molybdenum disilicide 32 is added since studies indicated that silicon tetraboride 34 would oxidize in a porous coating because of the large exposed surface. The silicon tetraboride 34 remains in the coating 26 as a flux which oxidizes during processing to ensure fusion at the optimum sintering temperature of 1220° C. The substrate 24 is a homogenous alumina enhanced thermal barrier (AETB) and is described more fully in the above-identified Leiser et al. Ceramic Engineering and Science Proceedings and Leiser et al. NASA CP 2357 references. Spraying 30 is done in three applications to control the penetration of the mixed slurry into the substrate 24.

The glass matrix frit 36 can be prepared with various boron oxide contents varying from about 2 to about 10 weight percent, as is more fully disclosed in the above-referenced Goldstein et al. U.S. Pat. No. 4,093,771 and Goldstein et al. Plenum Publishing reference. The preferred composition, custom made, is about 3 weight percent added (to give a total of 5.75 weight percent) boron oxide to a commercially available, relatively pure acid leached borosilicate glass available under the name Vycor. The resulting reactive glass frit 36 is so-called because it is a two phase glass system with a very reactive high boria content borosilicate glass layer on the outside, covering a more refractory low boria content borosilicate glass in the core of each particle.

Oxidation of the silicon tetraboride fluxing agent 34 in an exothermic reaction during the processing promotes glass matrix fusion and produces a high boron oxide borosilicate glass flux. The resultant multicomponent heterogeneous glass encapsulates the molybdenum disilicide emittance agent 32. The milling enhances the degree of oxidation attained during firing and permits penetration of the flux into the substrate during spraying. Silicon hexaboride and boron will also work as the fluxing agent.

The emittance agent 32 gives the surface layer 26 the required emissivity at high temperature. The amount of the emittance agent 32 may be varied from about 5 weight percent to about 40 weight percent, depending on the substrate 24 chosen. Suitable examples of the substrate 24 include silica, fibrous refractory composite insulation (FRCI), described more fully in the above-identified Leiser et al., American Ceramic Society Bulletin article and the alumina enhanced thermal barrier (AETB). The thermal expansion coefficient of the substrate 24 and/or the emittance requirements determine how much of the emittance agent is needed. For example, AETB requires about 20 weight percent molybdenum disilicide to assure surface compatibility.

The preferred composition of the surface layer 26 is about 77.5 weight percent reactive glass frit containing about 5.75 weight percent boron oxide, combined with about 2.5 weight percent silicon tetraboride and about 20 weight percent molybdenum disilicide. All of the components still in ethanol following milling are mixed together in a Kendall mixer or equivalent for a sufficient time (1 to 10 minutes) to blend the individual slurries together. This preferred composition is suitable for either the FRCI or AETB substrate 24. The substrate 24 is normally machined to about 0.3% larger than the required final size to correct for substrate shrinkage during subsequent firing. The slurry is then sprayed on the substrate at 30 using an airbrush or spray gun. It effectively impregnates the outer surface 28 of the insulation substrate 24, creating a fiber reinforced composite layer. The spraying is accomplished in three applications. Surface layers 26 varying from about 0.07 to about 0.21 g/cm² are generally acceptable. The preferred weight of the surface layer 26 is 0.14g/cm², about twice that used for a standard RCG coating. After spraying, the substrate 24 can be dried overnight at room temperature or for about two to about five hours at temperatures up to about 70° C., as indicated at 46.

After drying, the layer 26 is sintered in a furnace for about 90 minutes at temperatures from about 1200 to about 1260° C., as indicated at 48. For the preferred composition, the sintering is done for 90 minutes at 1220° C. The composite 20 is normally inserted into the furnace at temperature and cooled by rapid removal from the furnace. The final coating layer 26 appears flat black and is pervious to water penetration.

The following non-limiting examples describe the invention further and represent best modes for practicing the invention.

EXAMPLE I

Composite insulation material was prepared using the above preferred proportion of ingredients and procedure. The resulting insulation was compared with conventional RCG insulation for impact resistance. Impact resistance was measured utilizing a custom-made vertical drop impactor with a 0.95 cm diameter hemispherically shaped head having a mass of 232 g. Impactor drop height was varied to simulate the impact energy in joules (height times weight) typically observed on TPS surfaces of reentry vehicles. The results are summarized below in Table I.

TABLE I

| Impact Resistance of Reusable Surface Insulation Coatings | | |
|---|---|---|
| Impact (Joules) | Reaction-cured glass coating 10 | Toughened composite fibrous insulation 20 |
| 0.005 | Star cracking diam. = 0.18 cm | Impact imperceptible |
| 0.020 | A radial crack with 1 circular crack diam. = 0.61 cm | Impact imperceptible |
| 0.030 | A radial crack with 2.5 circular crack diam. = 0.71 cm | Impact imperceptible |
| 0.1 | Coating failed | Partially shattered impact cone diam. = 0.15 cm |
| 0.5 | Coating failed | Partially shattered impact cone diam. = 0.58 cm |
| 0.8 | Coating Failed | Partially shattered impact cone with 1 radial crack diam. = 0.74 cm |

Figure 7:
Figure 8:

FIG. 5 is a photomicrograph of the RCG coating 14 after the impact of 0.005 joule. The star crack is clearly visible at 60. FIG. 6 is a corresponding photomicrograph of the coating 26 after an impact of 0.01 joule. No damage is visible. At 0.02 joule, damage to the RCG coating 14 was three times more substantial than at 0.005 joule., with cracks emanating from the impact site across the coating surface and initial impactor penetration into the surface. A 50% increase in impact energy, 0.03 joule, for the coating 14 resulted in the exposure of the low-emittance substrate 12 under the coating 14, shown at 62 in FIG. 7. At an impact energy of 0.5 joule, damage to the coating 26 was limited to impact sites, which are about the same size as the damage to RCG with an energy of 0.02 joule (25 times better). The coating 26 shows no penetration into the substrate 24 at an impact energy of 0.8 joule, shown in FIG. 8. The exact point at which a failure of the coating 26 occurs is difficult to define because of its composite-like structure.

Figure 9:
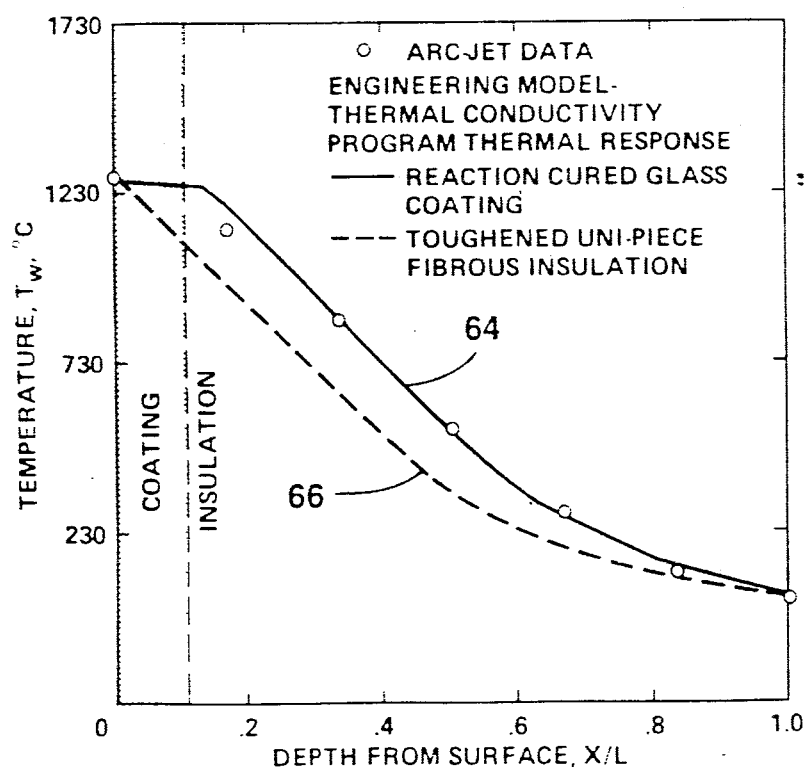
FIG. 9 is a graph showing comparative thermal conductivity of the composite insulating materials of FIG. 1 and of FIGS. 2-3.
Figure 10:
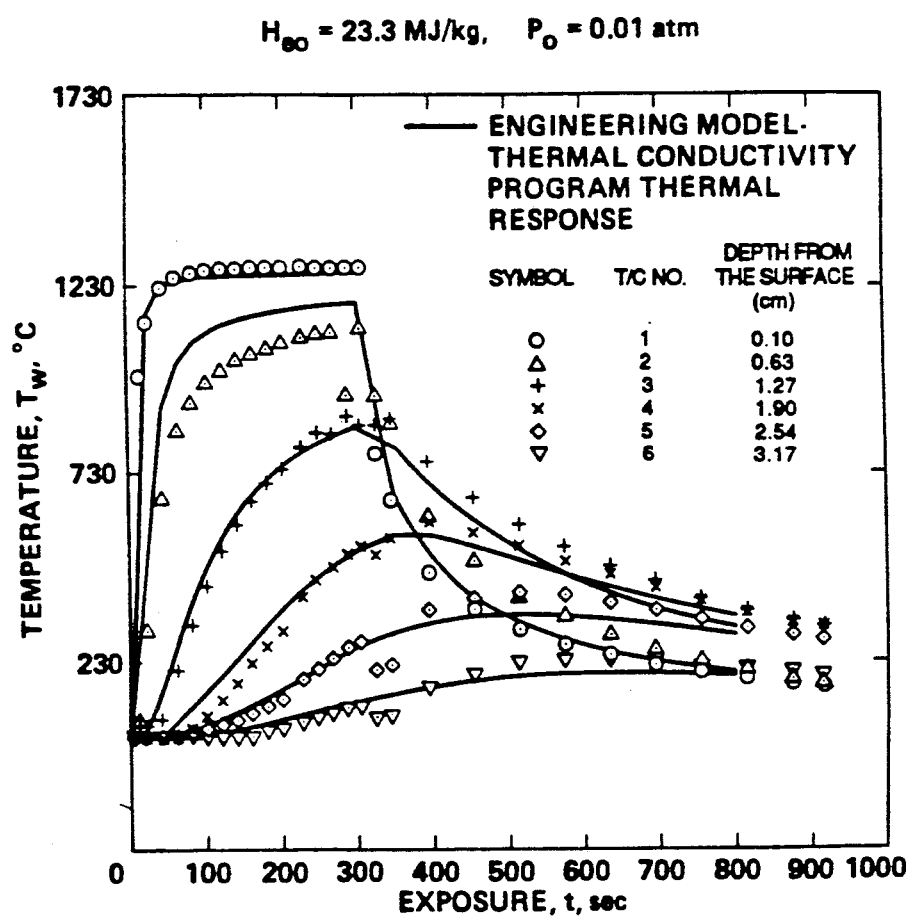
FIG. 10 is a graph further showing thermal conductivity properties of the composite insulating material of FIGS. 2-3.

Temperature profiles 64 and 66 through the toughened fibrous composite insulation 20 and the RCG coating 10 are shown in FIG. 9. Predictions for the insulation 20 and the RCG coating 10 on AETB are calculated with a computer program described in D. A. Stewart et al., "Characterization of the Thermal Conductivity for Fibrous Refractory Composite Insulations," Ceramic Engineering and Science Proceedings, Vol. 6, No. 7-8, 1985, pp. 769-792 and D. A. Stewart et al., "Thermal Response of Integral Multicomponent Composite Thermal Protection Systems," AIAA 20th Thermophysics Conference, Virginia, 1985. This model has successfully predicted the thermal response of similar materials. FIG. 9 shows that the slope of the temperature profile through the insulation 20 is equivalent to an AETB insulation coated with RCG 10. FIG. 10 compares the thermal response of insulation 20 with predicted in-depth temperatures. These Figures show the desired low conductivity of the composite.

The insulation 20 is between 20 and 100 times more resistant to impact than the RCG coating insulation 10 currently used on Space Shuttle RSI tiles. The insulation 20 performs as well as the baseline RCG coating insulation 10 in a convectively heated environment at temperatures in excess of 1260° C. It provides comparable insulation capability and does not crack.

EXAMPLE II

A quantity of 300 g of 5.8% by weight total boron oxide reactive Vycor glass frit is ball milled "dry" for 48 hours with 0.5 g of benzylic acid grinding aid. After this initial particle size reduction, 294.8 g of the frit is balled milled together with 7.8 g of silicon tetraboride, 129.6 g of molybdenum disilicide and 432.1 g of ethanol for 14 hours. FRCI-20-12 and AETB-12-20-68 substrates (15 cm × 15 cm × 6.35 cm) were then submerged in the slurry for about 15 seconds to penetrate adequately the top surface. The dipped substrates were then sintered at 1218° C. for 90 minutes in a clean, electrically heated furnace. The resulting composites have properties similar to those of the composites of Example I.

EXAMPLE III

A reactive glass frit is ball milled as in Example II. Following ball milling, 175.5 g of the frit are mixed with 4.5 g of silicon tetraboride, 45 g of molybdenum disilicide, 0.3 g of colloid 252 grinding aid, and 225 g of ethanol in a ball mill for 24 hours to prepare a slurry. A low density, 0.19 g/cc AETB-12-20-68 substrate previously laminated to a FRCI-20-12 base insulation was then dipped into the slurry for 15 seconds to impregnate effectively the AETB substrate. After dipping, the system was dried at room temperature overnight and sintered at 1218° C. for 90 minutes. The resultant laminated composite was an order of magnitude tougher than the standard RCG coated insulation in Example I.

EXAMPLE IV

A reactive glass frit, silicon tetraboride and molybdenum disilicide are ball milled in accordance with the procedure of Example I. Following ball milling, 31.9 g of the frit are placed in a Kendall mixer with 1.4 g of silicon tetraboride and 22.2 g of molybdenum disilicide to prepare the slurry. The slurry was then sprayed on a low density, 0.19 g/cc AETB-40-48 insulation substrate in three applications. After spraying, the substrate was dried at room temperature overnight and sintered at 1218° C. for 90 minutes. The resulting composite was compatible with the higher temperature capability substrate with an order of magnitude tougher surface than the standard RCG coated insulation in Example I.

EXAMPLE V

A reactive glass frit, silicon tetraboride and molybdenum disilicide are ball milled in accordance with the procedure of Example I separately in ethanol, but at 75% by weight solids. Following ball milling, each component is diluted to 25% solids. A master slurry is prepared by mixing (by weight) 77.5% reactive glass frit with 2.5% silicon tetraboride and 20% molybdenum disilicide. The slurry is then sprayed on a low density 0.19g/cc AETB-20-68 insulation substrate in three applications. The composite is then dried and fired as before. Impact resistance is similar to the composite in Example I.

It should now be readily apparent to those skilled in the art that a novel low density insulation material capable of achieving the stated objects of the invention has been provided. The insulation material has a composite ceramic-intermetallic layer surface providing a system with both high emissivity and enhanced toughness relative to impacts. It is the first heatshield insulation in which porosity has been purposely introduced into the high emittance surface layer to improve the system's overall performance. This insulation effectively inhibits crack propagation from impacts because of the large number of pores present, which act as deflectors to a crack front. The ductility of the intermetallic and the surface layer's overall lower modulus of elasticity also appear to play a role in the system's relative toughness. It represents the first RSI impregnated in its entirety or at the "surface" only using a high emissivity material and a glass to improve toughness and strength in general. It is the first high temperature high emittance composite to use RSI as the skeleton for the composite.

It should further be apparent to those skilled in the art that various changes in form and detail of the invention as shown and described may be made. It is intended that such changes be included within the spirit and scope of the claims appended hereto.

What is claimed is:

1. A porous body of fibrous, low density silica-based insulation material, said porous body being at least in part impregnated with a mixture comprising a reactive glass frit, a fluxing agent and an emittance agent.

2. The porous body of insulation material of claim 1 in which less than all of said porous body is impregnated with the mixture comprising the reactive glass frit, the fluxing agent and the emittance agent.

3. The porous body of insulation material of claim 1 in which said reactive glass frit comprises a boron oxide containing borosilicate glass.

4. The porous body of insulation material of claim 3 in which the borosilicate glass contains from about 2 to about 10 weight percent boron oxide.

5. The porous body of insulation material of claim 3 in which said fluxing agent comprises silicon tetraboride.

6. The porous body of insulation material of claim 5 in which said fluxing agent is present in an amount of from about 2 to about 10 weight percent.

7. The porous body of insulation material of claim 3 in which said emittance agent comprises molybdenum disilicide.

8. The porous body of insulation material of claim 7 in which said emittance agent is present in an amount of from about 5 to about 40 weight percent.

9. The porous body of insulation material of claim 8 in which said reactive glass frit comprises a boron oxide containing borosilicate glass and is present in the mixture in an amount of about 77.5 weight percent, said fluxing agent comprises silicon tetraboride and is present in the mixture in an amount of about 2.5 weight percent, and said emittance agent is present in the mixture in an amount of about 20 weight percent.

10. The porous body of insulation material of claim 8 in which said fibrous, low density silica-based insulation material is an alumina enhanced thermal barrier.

* * * * *